Oct. 18, 1932.                E. SCHIMANEK                1,882,970
                        INTERNAL COMBUSTION ENGINE
                     Filed Sept. 17, 1928      4 Sheets-Sheet 1
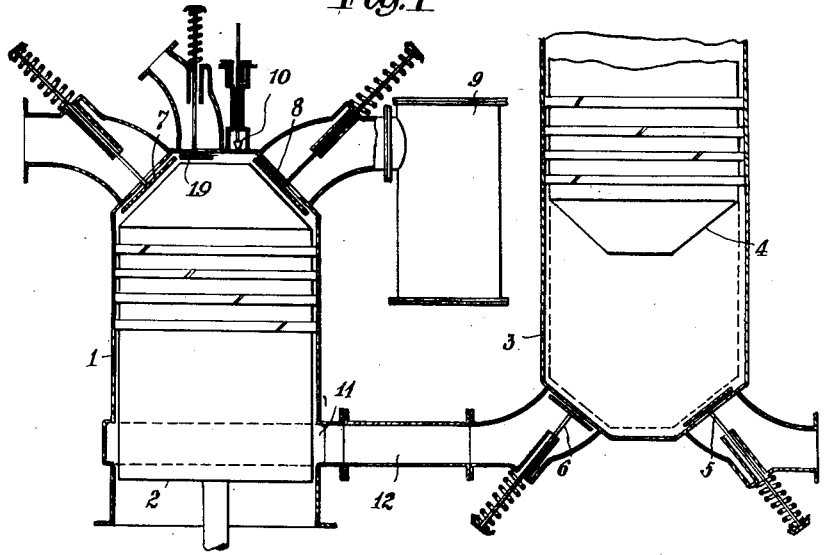
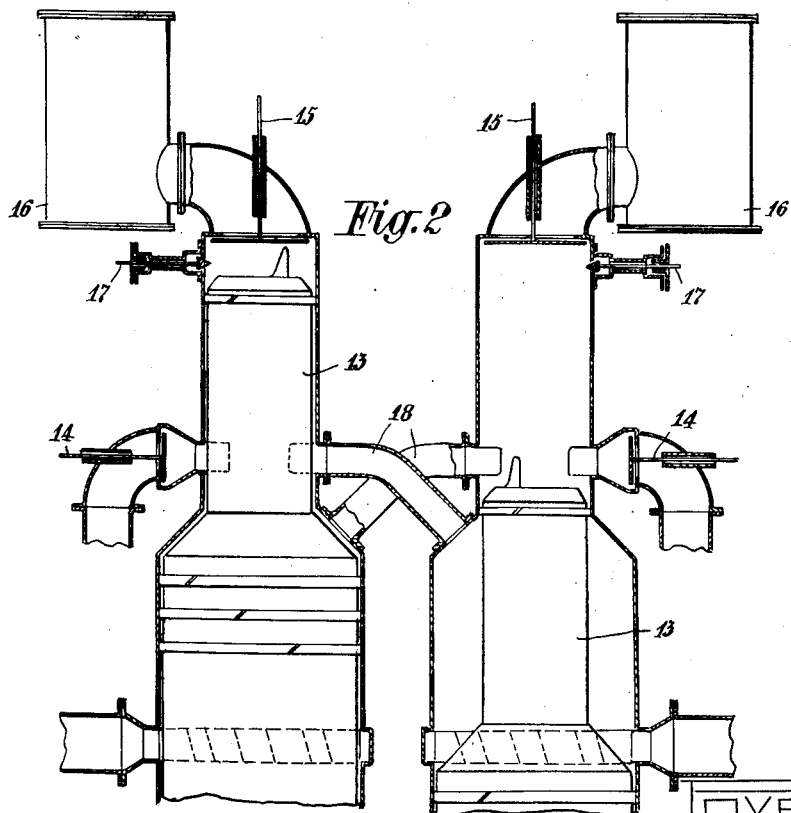

Oct. 18, 1932.  E. SCHIMANEK  1,882,970
INTERNAL COMBUSTION ENGINE
Filed Sept. 17, 1928   4 Sheets-Sheet 2
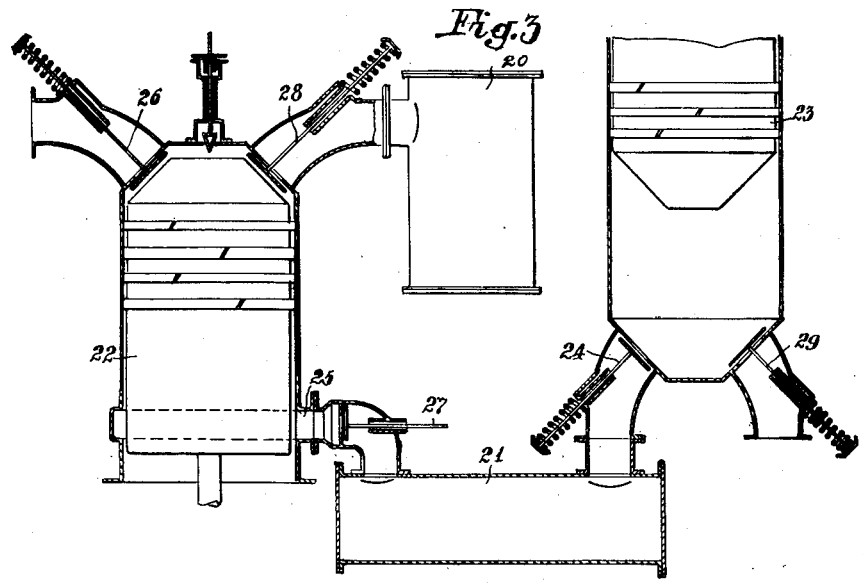
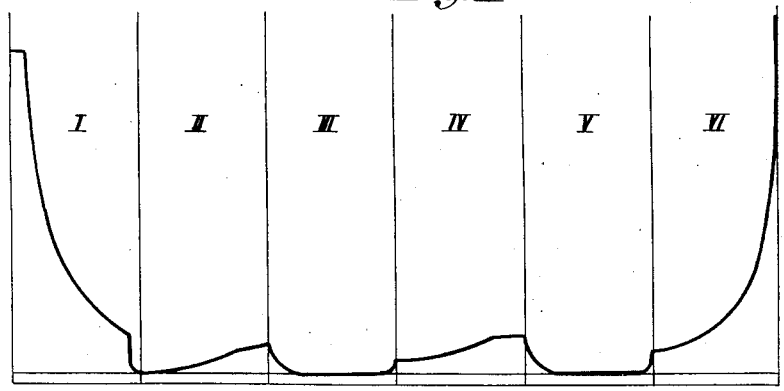
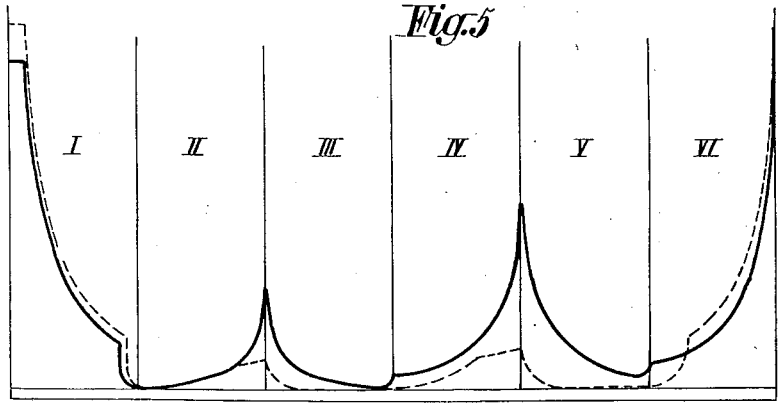
Inventor
Emil Schimanek
by Charles... Attys.

Oct. 18, 1932.  E. SCHIMANEK  1,882,970
INTERNAL COMBUSTION ENGINE
Filed Sept. 17, 1928   4 Sheets-Sheet 3
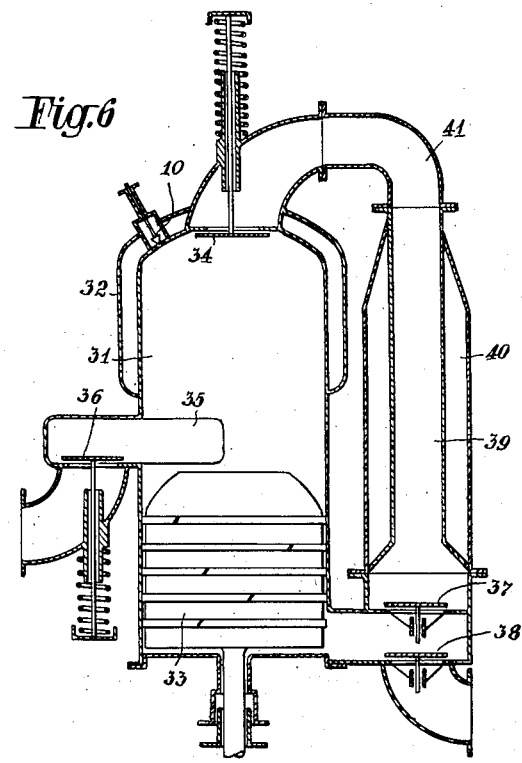
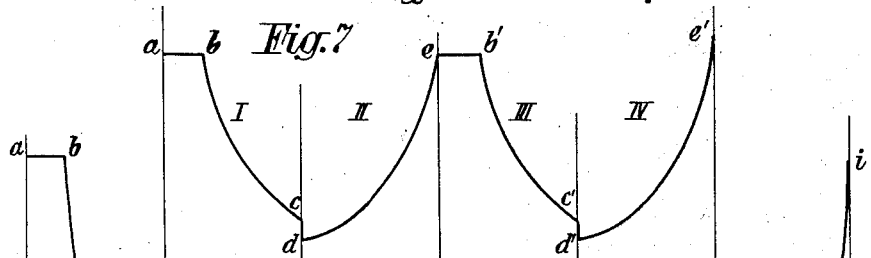
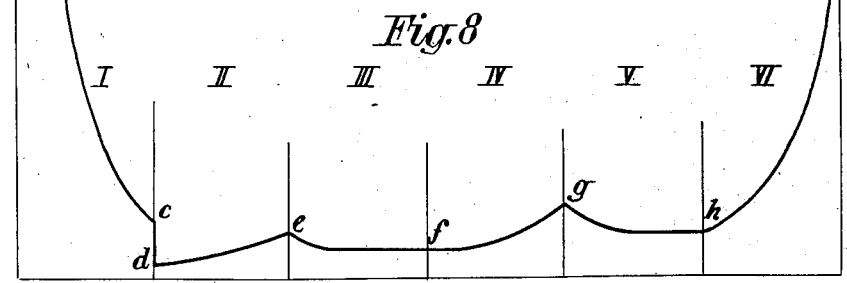

Oct. 18, 1932.  E. SCHIMANEK  1,882,970
INTERNAL COMBUSTION ENGINE
Filed Sept. 17, 1928  4 Sheets-Sheet 4
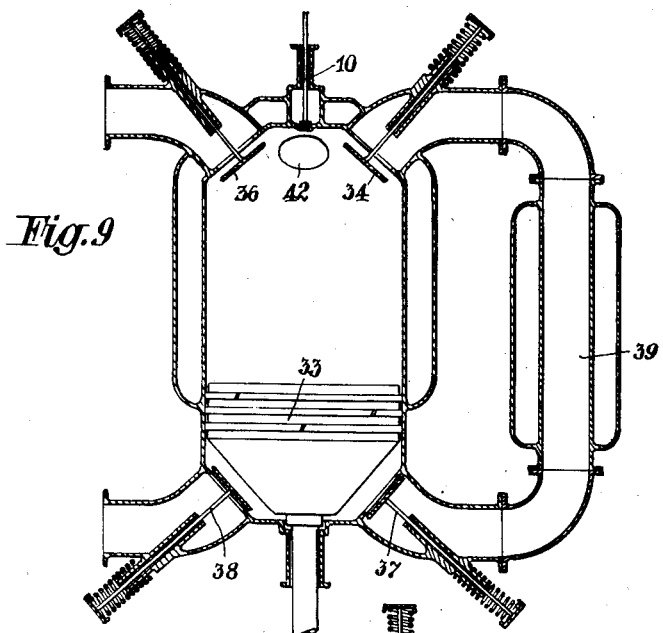
Fig.9
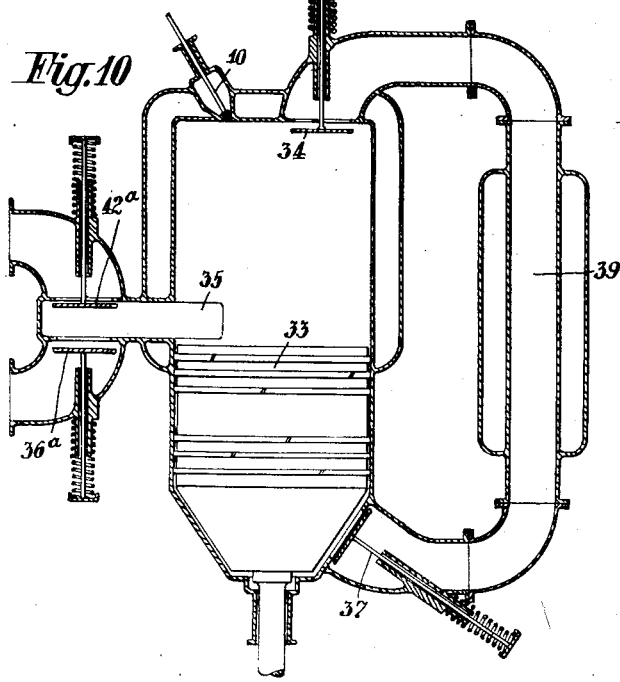
Fig.10
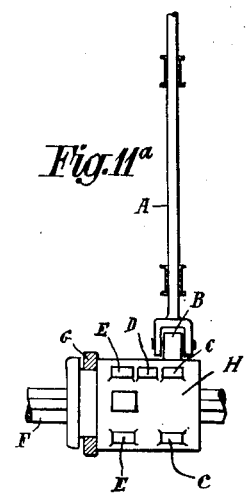
Fig.11ᵃ
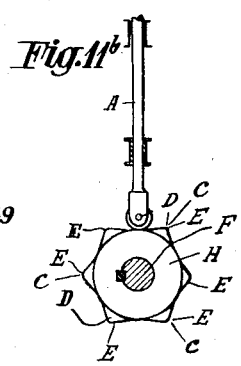
Fig.11ᵇ
Inventor
Emil Schimanek
by Charles+... Attys.

Patented Oct. 18, 1932

1,882,970

UNITED STATES PATENT OFFICE

EMIL SCHIMANEK, OF BUDAPEST, HUNGARY

INTERNAL COMBUSTION ENGINE

Application filed September 17, 1928, Serial No. 306,300, and in Austria October 4, 1927.

This invention relates to internal combustion engines working on the four-stroke cycle, or on a cycle comprising more than four strokes, such for example as a six-stroke or an eight-stroke cycle.

The object of the invention is to increase the power of such internal combustion engines, and moreover to render the internal combustion engine capable of being run at will on a cycle comprising a different number of strokes, as for example running a four-stroke engine as a two-stroke engine or running a six-stroke engine as a two-stroke or a four-stroke engine and so on. The capacity of an internal combustion engine to run with different numbers of strokes per cycle provides in the first place a means of utilizing the advantages presented by a multi-stroke engine as regards excess power and fuel introduction, as well as atomization, and particularly at high speeds in this last respect, and of changing over to the two-stroke cycle or to a cycle comprising a small number of strokes at those loads at which such a cycle presents advantages, and thereby using the best attainable working conditions. On the other hand this capacity provides a means of facilitating the starting of four-stroke and multi-stroke engines by starting them as two-stroke engines and then changing over to the normal cycles, this changing over to the normal cycles being effected gradually or in stages in engines which normally run on a cycle comprising more than four strokes.

The method of working according to the present invention consists in the fact that the working cylinder, at the end of the combustion stroke, as in a two-stroke engine, is scavenged and filled with fresh air produced by a charge compressor, and this air filling forms part of the combustion air in the normal working cycle. The method or working according to the invention is such that in the working cylinder, at the end of the outward strokes following the combustion stroke, or at least at the end of the last of these strokes, fresh air is introduced by a charge compressor, which also scavenges and fills the working cylinder with fresh air at the end of the combustion stroke, as in the case of a two-stroke engine. The working process according to the invention has the result, for a four-stroke or multi-stroke engine, that the engine uses more air than a two-stroke engine, whereby the invention presents a simple means of increasing the power of multi-stroke engines. This increase of power is greater than would correspond proportionally to the power of a two-stroke engine, for in the case of a two-stroke engine a portion of the charging air is scavenged out with the combustion gases, whereby this portion is lost so far as the output of work is concerned. This action only occurs, with the process according to this invention, at the first filling, which forms a portion of the total filling when working on a four-stroke or multi-stroke cycle, but not in the case of the subsequent fillings or chargings of the working cylinder, which form the remainder of the total filling, so that in the case of the admissions following the first admission, losses of work resulting from losses of air are prevented. The power output can be still further increased according to the invention by also utilizing the working piston for drawing air by suction into the working cylinder, and by this quantity of air the quantity of air delivered by the charge compressor during the scavenging and the succeeding fillings of the working cylinder is increased.

In the process according to the present invention the air delivered in partial quantities in a plurality of strokes of one working cycle by the charge compressor either alone or in combination with air suction into the working cylinder can be utilized in its entirety during one stroke, namely the combustion stroke, for the performance of work.

Various constructional forms of the present invention are illustrated by way of example in the accompanying drawings, in which Figs. 1 to 3 show three different constructional forms of an engine according to the invention, Fig. 4 shows a diagram of the engine illustrated in Fig. 1 when working on a six-stroke cycle, Fig. 5 shows the diagram of the engine illustrated in Fig. 1, when the engine is only working with the air produced by the compressor, Fig. 6 shows a constructional form in which the working cylinder is only charged with air which is supplied by the air pump, Figs. 7 and 8 indicate the variation of pressure in the working cylinder of the engine illustrated in Fig. 6, Fig. 9 shows a constructional form in which the air employed for combustion in the working cylinder is delivered both by air suction into the working cylinder and by means of the charging air pump, Fig. 10 shows a constructional example in which the working cylinder and the charging air pump have an air-suction valve in common, and Figs. 11a and 11b show a detail device of the valve gear.

In the constructional example shown in Fig. 1, 1 is the working cylinder, 2 the working piston, 3 the compresssor cylinder, 4 the compressor piston, 5 the suction valve of the compressor, 6 the delivery valve of the compressor, 7 the exhaust valve of the working cylinder, and 8 the overflow or relief valve from the working cylinder to a vessel 9 or conversely. The compressor is connected with the working cylinder by a pipe 12 connected to the delivery valve 6.

The working cylinder has a suction valve 19, in addition to the valves 7 and 8 illustrated in the figure. A needle valve 10 serves for the introduction of fuel into the working cylinder.

A motor constructed according to this example can work by the two-stroke cycle or by the four-stroke cycle, or even by the six-stroke or other multi-stroke cycle, according to the position of the valve gear.

Hence the method of working is dependent upon the number of strokes with which the working cylinder is designed to work.

When working on the two-stroke cycle the procedure is as follows:—the working piston descends from its upper dead centre, while the compressor piston is likewise moving downwards from its upper dead centre.

In the working cylinder combustion and expansion takes place during this stroke, while in the compressor cylinder the air is compressed; and, towards the end of the stroke, is expelled through the delivery valve 6 into the tube 12. Before the working piston opens the ports 11 in the cylinder wall the exhaust valve 7 is opened, so that the combustion gases are expanded. After the opening of the cylinder port 11, air flows from the compressor or from the tube 12 through the delivery valve 6 and the connecting tube 12 through the ports 11 into the working cylinder and forces the expanded combustion gases that still remain therein through the exhaust valve 7 into the open. During the next stroke the piston 2 ascends. In the working cylinder compression takes place. At the same time the piston 4 likewise moves upwards and draws in fresh air through the suction valve 5. Hence when working on the two-stroke cycle the suction valve, of the working cylinder, does not come into action at all and accordingly only that quantity of air which is delivered by the compressor is dealt with in the working cylinder.

The working of the same motor on the six-stroke cycle for example proceeds as follows:—

First stroke: The piston of the working cylinder descends, and combustion and expansion occur in the cylinder. At the same time the compressor piston descends and compresses the air previously drawn in by suction.

In the neighbourhood of the lower dead centre, before the working piston opens the ports 11 in the cylinder wall, the exhaust valve 7 is opened and the combustion gases flow out of the working cylinder into the atmosphere, and an expansion of these gases takes place in the cylinder. Just after this the ports 11 are opened by the piston 2, whereby air flows through these ports into the working cylinder and clears the latter of the combustion gases.

Second stroke: The pistons 2 and 4 move upwards; and in the working cylinder compression takes place. Since however towards the end of the stroke the overflow valve 8 is opened, the compressed air is delivered into the reservoir 9.

During this stroke the compressor piston 4 draws in fresh air through the suction valve 5.

Third stroke: During the working movement the working piston 2 draws fresh air into the working cylinder through the suction valve, not shown in the figure, while the piston 4, which is likewise moving downwards, compresses the air previously drawn in by suction and expels it into the pipe 12. Towards the end of the stroke, after the suction valve of the working cylinder has been closed, the piston 2 opens the ports 11, and the air drawn in by the working piston is supplemented by the air delivered by the compressor and flowing in through the ports 11, the working cylinder thus being supercharged by the latter quantity of air.

Fourth stroke: During this stroke, as during the second stroke, the air in the working cylinder is forced into the reservoir 9 and fresh air is drawn by suction into the compressor.

Fifth stroke: The details of this stroke are exactly the same as those of the third stroke.

Sixth stroke: The working piston 2 moves upwards and compresses the air to the desired extent (the extent of the precompression), which is determined by the portion of the stroke which the piston covers during this compression. This precompression may however be equal to zero or may be omitted. After the precompression has been effected, or, in the event of it being omitted, after ports 11 have been closed, the valve 8 is opened. The air forced into the reservoir 9 during the two previous charging strokes flows back into the working cylinder, so that the latter is filled with a multiple, theoretically five-fold, of that quantity of air which would fill it at atmospheric pressure. The valve 8 is closed after being open for a suitable short time, and, during the further upward movement of the piston 2 effects the final compression right to that terminal pressure at which combustion is to take place.

During this stroke the compressor piston 4 draws air by suction into the compressor cylinder.

When the motor is intended to work on the four-stroke cycle, the valves 7 and 8 are so controlled that after the first and second strokes the procedure that follows is the same as that described in the case of the six-stroke motor as the fifth and sixth strokes.

Hence it only depends upon the controlling of the valves illustrated whether the motor works on the two-stroke, the four-stroke, the six-stroke or other multi-stroke cycle. By an adjustment, for instance a longitudinal displacement or any other convenient adjustment of the cam shaft, the result can be obtained that the motor works temporarily on different cycles one after the other.

The pressures occurring in the working cylinder when the engine is working on the six-stroke cycle are illustrated in Fig. 4 by recording the six strokes in succession on the abscissa axis, while the ordinates represent the pressure prevailing in the working cylinder.

The temporary storage of the combustion air may also be effected in the working cylinder. In this case the reservoir 9 and the valve 8 are omitted. As contrasted with the method of working previously described in which not only the air drawn in by the compressor but also the air drawn in by the working piston are used, in the case of the air being stored in the working cylinder itself only the air delivered by the compressor can be used, since in the working cylinder a greater pressure prevails during all strokes than the pressure of the external atmosphere, so no suction of air can be effected.

The pressures prevailing in the working cylinder in this case are shown in Fig. 5 for an engine working on the six-stroke cycle. During the individual successive strokes, the following changes of condition succeed one another in the working cylinder.

First stroke: Combustion and expansion until by the opening of the valve 7 the expansion of the combustion gases takes place, and immediately thereafter, after the opening of the ports 11, the scavenging of the cylinder is effected by the air delivered by the compressor during one stroke.

Second stroke: Compression of the filling.

Third stroke: Expansion of the filling until, with the exhaust valve closed, after the opening of the ports, the second charging takes place.

Fourth stroke: Compression of the double charge.

Fifth stroke: Expansion of the doubled charge, until, after the opening of the ports 11, the third charge takes place.

Sixth stroke: Compression of the three-fold charge, at the end of which the terminal pressure desired for the combustion occurs.

This engine, like the engine previously described, can work on the two-stroke, four-stroke and six-stroke cycles, or on a cycle comprising more than six strokes, and the means necessary for altering the number of strokes consists simply in the fact that the cam shaft is displaced or the exhaust valve and the fuel injection valve are opened in any other way after every revolution or after every second or third revolution of the engine shaft.

In Fig. 2 is illustrated by way of example a second constructional form of the invention.

The difference between this constructional form and Figure 1 consists in the fact that here a differential piston 13 serves as a working and compressor piston, and that the exhaust valve 14 is arranged at the end of the stroke and is connected by ports with the working cylinder space.

The valve 15 is the overflow valve to a reservoir 16. The needle valve 17 serves for the introduction of the fuel.

In the constructional example illustrated in the drawings, each two cylinders provided with cranks rotated through 180 degrees cooperate as illustrated in the Figure by the pipe connection 18. The reservoirs 16 pertaining to the two working cylinders may be connected if desired.

The two methods of working described above in reference to Fig. 1 (temporary storage of the air in a vessel or in the working cylinder itself) may also be embodied in the constructional example illustrated in Fig. 2.

In Fig. 3 is illustrated a further constructional example, which is distinguished from the one described above by the fact that the air sucked in by the working cylinder and the air delivered by the compressor are stored in separate reservoirs 20 and 21 respectively.

The method of working of this constructional form on a six-stroke cycle for example is as follows:—

First stroke: The working piston 22 and the compressor piston 23 descend. In the working cylinder, combustion and expansion take place. In the compression cylinder compression and expulsion of the air through the pressure valve 24 into the vessel 21 take place.

Before the working piston 22 opens the ports 25 located at the lower end of the stroke in the side of the working cylinder, the exhaust valve 26 is opened and the expansion of the combustion gases is effected. Just after this, through the ports 25, when the valve 27 opens, air is blown out of the vessel 21 into the working cylinder, whereby the working cylinder is cleared of the combustion gases and filled with fresh air.

Second stroke: Both pistons ascend. In the working cylinder the charge is at first a little compressed and is then forced through the valve 28 into the reservoir 20.

In the compressor cylinder during this stroke air is drawn in by suction through the valve 29.

Third stroke: In the working cylinder, fresh air is drawn in by suction through a suction valve not shown in the figure.

In the compressor the air is compressed and forced through the valve 24 into the reservoir 21.

Fourth stroke: In the working cylinder air is compressed as in the second stroke and forced into the vessel 20, while fresh air is drawn into the compressor cylinder by suction.

Fifth stroke: In the working cylinder and in the compressor cylinder the same changes of condition occur as in the third stroke. As soon, however, as the working piston opens the ports 25 near the lower end of its stroke, the valve 27 is opened, and the air forced into the vessel 21 during the preceding compression strokes flows through this valve 27 into the working cylinder, whereby the same is supercharged.

Sixth stroke: After the working piston during its ascent has closed the ports 25, or if the charge has already been compressed to the desired extent by a further advance of the piston, the working cylinder is placed in communication with the vessel 20 by the opening of the valve 28, whereby an equalization of pressure is produced, that is to say, the air forced into the vessel 20 during the preceding strokes flows back into the working cylinder, thereby producing a further supercharging thereof.

After being open for a suitable time the valve 28 closes, and the entire charge in the working cylinder is finally compressed to the desired combustion pressure during the movement of the working piston right to its upper dead centre.

In Fig. 5 the variations of pressure occurring in the working cylinder are shown in dotted lines.

The working processes described above can of course be appropriately combined with one another.

By heating the reservoirs with the exhaust gases, the waste heat that would otherwise be lost can be conveyed into the precompressed air and utilized for the performance of work. This heating can also be carried out in the case of the temporary storage of air in the working cylinder itself, by means of heating surfaces arranged in the latter.

In Fig. 6 is shown a constructional example in which the charging air pump delivers the air directly into a vessel in which the air from the working cylinder can also be transferred from time to time for storage purposes. The charging air is therefore in this case not supplied, as previously, through the working cylinder to the reservoir, but the reservoir is charged with air directly by the charging pump.

In the constructional example of Fig. 6, 31 is the cylinder, which is equipped with a cooling jacket 32, in which for example cooling water circulates, and 33 is the piston. The space above the piston is the working cylinder space, and the space below the piston is the pump cylinder space. 38 is the suction valve and 37 the delivery valve for the pump cylinder space. To the delivery valve 37 is connected a pressure space or air reservoir for the pump consisting of a tube 39 and an elbow 41, and communicating with the working cylinder space by way of a valve 34 fitted into the cylinder head. The pressure space or air reservoir is provided with a heating jacket 40, for the purpose of enabling the air stored in the pressure space to be heated by means of the combustion gases for example if desired.

The cylinder 31 is provided at the bottom with an exhaust port 35, which opens into a space in which the exhaust valve 36 is arranged.

In Figs. 7 and 8 are shown the diagrams in which the variations of pressure above the piston are plotted as ordinates, whereas the volume for the individual strokes I, II—I, II are plotted in succession as abscissæ.

The method of working of this engine is as follows:—

When the engine is working on the two-stroke cycle the procedure is in accordance with Fig. 7. Starting from the combustion and expansion stroke, which is represented in Fig. 7 by the line $a, b, c$, the introduction of the fuel and the combustion take place above the piston during the descent of the piston according to the line $a, b$, and the expansion of the combustion gases takes place according to the line $b, c$, while underneath the piston the air sucked in during the previous stroke is forced through the valve 37 into the vessel 39.

When the piston reaches its lower dead centre, the exhaust valve 36 is opened, and the expansion of the combustion gases takes place above the piston according to the line c, d.

After this has occurred the valve 34 is opened and air flows out of the vessel 39 into the cylinder and drives the products of combustion that are still contained therein through the exhaust valve 36, which at this time is still open, into the atmosphere. In the diagram it is assumed that this expulsion of the products of combustion is effected during the position of rest of the piston at the lower dead centre, so this change of condition is included in the line c, d.

Hereupon both the exhaust valve 36 and the valve 34 are closed, and the compression of the charge of air is effected above the piston during the ascent of the piston, whereas below the piston the suction of fresh air is effected through the suction valve 38. The change of condition above the piston is shown by the line d, e.

The piston 33 must be made so long that the port 35, even in the highest position of the piston, is not uncovered by the lower edge of the piston.

During the next stroke the combustion is again effected above the piston according to the line e—b', then the expansion according to the line b'—c' as previously described, and with this stroke the repetition of the series of operations commences.

Fig. 8 shows the method of working when operating on the six-stroke cycle. In representing the variations in pressure a start is again made with the combustion and expansion stroke, which proceeds in the manner previously described. At the lower dead centre of the piston there occurs, as in the previous case, first the exhaust through the valve 36 and then the expulsion of the combustion products from the cylinder by the air flowing into the cylinder from the reservoir 39 through the valve 34.

The second stroke on the contrary proceeds differently from the second stroke in the two-stroke cycle, for at the dead centre only the valve 36 is closed, while the valve 34 remains open. During the ascent of the piston, therefore, the air in the cylinder and in the space 39 connected therewith is compressed (see line d—e), whereas below the piston, as previously described in connection with the two-stroke cycle, fresh air is drawn in by suction.

During the third stroke the piston moves downwards. The valve 34 is open, so that air from the reservoir 39 flows back again into the cylinder. At the same time, underneath the piston, the air which was sucked in during the earlier stroke, is delivered through the delivery valve 37 into the reservoir 39.

Since the increase of volume, which is occasioned above the piston by the downward movement of the piston, is of exactly the same magnitude as the decrease of volume above the piston, the line in the working diagram (marked e—f in the figure) shows initially a diminution of pressure, which lasts until the rising pressure in the pump chamber reaches the falling pressure in the working chamber and then continues at constant pressure.

During the fourth stroke the air above the piston is forced through the still open valve 34 into the reservoir 39 (the pressure line f—g) and fresh air is sucked in below the piston.

During the fifth stroke, the valve 34 still being open, the same change of condition takes place as during the third stroke (line g—h).

Now at the lower dead centre of the piston the valve 34 is closed, and during the sixth stroke the air above the piston is compressed according to the line h—i, and below the piston fresh air is again sucked in.

If the engine is working on the four-stroke cycle, the first three strokes are the same as on the six-stroke cycle. Instead however of the compression f—g, which takes place in the fourth stroke of the six-stroke cycle, a compression h—i occurs with the starting point f.

In the eight-stroke cycle, to the first five strokes described in connection with the six-stroke cycle are added two additional strokes, which correspond to the fourth and fifth strokes in the six-stroke cycle, and only then is the final compression of the air effected in the cylinder during the eighth stroke.

Hence an alteration of the control of the valves 36 and 34 is sufficient to enable the motor to work on a cycle of any number of strokes.

In the two-stroke cycle the valve 34 always remains open only during the short time of the expulsion of the combustion products (line c—d), during which time the valve 36 is also opened.

In the four-stroke cycle the exhaust valve 36 is opened for a short time once after each four strokes at the dead centre of the piston, after the expansion stroke, whereas the valve 34, which is likewise opened at the same dead centre, remains open for the duration of two strokes, and is closed again at the lower dead centre of the piston.

In the six-stroke cycle the exhaust valve 36 is opened at the lower dead centre after each six strokes and left open for a short time, as when working on other cycles. The valve 34 is opened as previously after the expansion stroke at the lower dead centre of the piston and remains open for the duration of four strokes.

In the eight-stroke cycle the movement of the exhaust valve is effected after each eight strokes and the valve 34 remains open for the duration of six strokes.

In the construction according to Fig. 9, 42 is a suction valve and 36 an exhaust valve for the working cylinder, while the remaining valves have the same reference numerals as in Fig. 6.

The method of working is as follows:

First stroke: If the piston 33, which acts as a compressor in the lower space and as a working piston in the upper space, moves downwards starting from its upper dead centre, there take place in the working cylinder space the injection of fuel, the combustion and the expansion, while in the pump chamber the air sucked in during the preceding stroke is forced through the pressure valve 37 into the reservoir 39 which is common to the pump and the working cylinder. At the lower dead centre the exhaust valve 36 opens, and an expansion of the expanded combustion gases takes place. At the same moment the valve 34 opens and the air flows out of the vessel 39 into the working cylinder space and clears the latter of the exhaust gases.

The procedure during the following strokes depends upon whether the motor is to work on a two-stroke cycle or on a cycle containing more than two strokes.

In the two-stroke cycle after the end of the scavenging, and just after the lower dead centre position at the beginning of the second stroke both the valve 36 and the valve 34 are closed, and compression takes place in the working space right to the upper dead centre, while in the pump chamber air is sucked in through the suction valve 38. At the upper dead centre the injection of fuel through the valve 10 into the working space begins and the series of operations recommences.

In working on a cycle comprising more than two strokes, on a six-stroke cycle for example, in the second stroke, just after the piston has left the lower dead centre, that is, after the combustion gases have been scavenged out of the working cylinder space, the exhaust valve 36 is closed, while the overflow valve 34 remains open, until the piston reaches its upper dead centre, and during this stroke the air is forced out of the working cylinder into the reservoir 39, while in the pump chamber suction of fresh air takes place through the valve 38. It may be advantageous, during the exhaust, by slighter opening of the exhaust valve for example, to throttle the exhaust, and thereby to occasion the filling of the cylinder with air from the reservoir at a higher pressure, which also has the advantage that the loss of air that occurs during the expulsion is smaller, that is, more air remains behind in the reservoir 39, and can then be used for the combustion. Under these circumstances this pressure can be adjusted either by hand or automatically by means of a regulator according to the speed of revolution of the motor for the time being, the exhaust being for example more severely throttled when the speed of revolution is lower.

Third stroke: In the working cylinder, after the valve 34 is closed at the upper dead centre, air is drawn in by suction through a suction valve 42, while in the pumping space the compressed air is delivered through the valve 37 into the reservoir 39.

Fourth stroke: The air in the working space, after the valve 42 is closed at the lower dead centre, is compressed, and, after the opening of the valve 34, is forced into the reservoir 39, whereas in the pumping chamber air is again sucked in through the valve 38.

Fifth stroke: In the working chamber, after the valve 34 is closed at the upper dead centre, air is drawn in through the suction valve 42, whereas in the pumping space compression takes place and transfer of the air through the valve 37 into the reservoir 39.

Sixth stroke: After the valve 42 is closed at the lower dead centre, just at the dead centre or else after the air in the working cylinder space has been compressed to a certain extent, the valve 34 is opened, whereupon the air delivered into the reservoir 39 during the preceding strokes flows into the working space. After this has occurred, that is, after the equalization of pressure between the working space and the reservoir has taken place, the valve 34 is closed, and there ensues in the working cylinder, during the further ascent of the piston right to the end of the stroke, the final compression of the whole of the combustion air. In the pumping space during this stroke, as in the fourth stroke, air is again sucked in through the valve 38. Then at the upper dead centre the injection of fuel begins and the series of operations is repeated.

In Fig. 10 is illustrated a constructional example which is distinguished from the ones previously described by the fact that the exhaust valve 36ª is arranged outside the working cylinder and a suction valve 42ª is employed which is common to the working space and the pumping space. The method of operation with this constructional example is as follows:—

When working on the two-stroke cycle the piston 33 moves downwards from its upper dead centre during the first stroke. In the working space the injection of fuel takes place at the dead centre, and during the stroke the expansion of the combustion takes place. In the pumping chamber the delivery of air is effected through the delivery valve 37 into the reservoir 39. When the upper edge of the working piston uncovers the aperture 35 in the working cylinder, the exhaust valve 36ª is opened either automatically by the excess pressure prevailing in the working space or positively by a valve gear and an expansion of the combustion gases takes place in the working space. After this has occurred the valve 34 is opened and the air flows out of the reservoir 39 into the working space, driving the combustion gases before it, and the working cylinder is cleared of the combustion gases and filled with fresh air. This filling of the working cylinder lasts until the piston 33 closes the port 35 during its ascent (second stroke), after which the valve 34 is likewise closed. During the further course of the second stroke, the air is finally compressed in the working space. At the upper dead centre the injection of fuel recommences and the series of operations is repeated. During the second stroke, in consequence of the upward movement of the piston, a vacuum is produced in the pumping space, the degree of which is enhanced until the lower edge of the piston 33 uncovers the port 35, and air flows into the pump space through the valve 42ª, an automatic valve for example, and equalizes the vacuum.

When working on the six-stroke cycle:

First stroke: The working piston moves downwards. After the injection of fuel has commenced at the upper dead centre the expansion is effected, and, at the moment when the upper edge of the piston uncovers the port 35, as in the case of the two-stroke cycle, the exhaust commences, and, after the opening of the valve 34, the scavenging of the combustion products. It may be advantageous, during the exhaust, either by stronger spring loading of an exhaust valve, an automatically acting exhaust valve for example, or by slighter opening of a mechanically controlled exhaust valve, to throttle the exhaust, and thereby to occasion the scavenging and filling of the cylinder from the reservoir at a higher pressure. In the pumping space compression and delivery of the air by way of the compression valve 37 into the reservoir 38 are effected during the first stroke.

Second stroke: After the upper edge of the ascending piston has closed the port 35, the air is transferred to the reservoir 39 through the valve 34, which still remains open. During this stroke there arises in the pumping space a vacuum, which, at the upper dead centre, after the lower edge of the piston has uncovered the port 35, is compensated for by the air flowing in by way of the valve 42ª.

Third stroke: The valve 34 is closed at the upper dead centre, and while the piston is descending a vacuum is produced in the working space, which, after the upper edge of the piston has uncovered the port 35, is compensated for by the air flowing in by way of the valve 42ª. In the pumping space delivery of air is effected through the pressure valve 37 into the reservoir 39.

Fourth stroke: In the working space compression is effected, and, after the valve 34 is opened, the air is driven into the reservoir 39. In the pumping space there arises a vacuum, which is compensated for at the upper dead centre by the fresh charge of air flowing in.

Fifth stroke: The same as the third stroke.

Sixth stroke: After the upper edge of the piston has closed the port 35, the valve 34 is opened either just after this or after the air in the working space has been compressed during part of the stroke, and an equalization of pressure takes place between the working space and the reservoir, the air delivered into the reservoir during the preceding strokes flowing into the working space. The valve 34 is then closed. Thereupon, during the remainder of the stroke, is effected the final compression of the entire charge in the working space. In the pumping space there occurs during this stroke a vacuum, which is compensated for at the upper dead centre by the air flowing in by way of the valve 42ª.

The change in the valve gear that is necessary for the change in the cycle may be effected in various ways, by shifting the cam shaft for example. The alteration in the valve gear may be effected either by hand or automatically by a regulator, such as a centrifugal governor. Thus for instance the engine may be started on the two-stroke cycle, and, after a certain predetermined speed of revolution has been attained, the centrifugal governor may shift the valve gear to the four-stroke cycle, then to the six-stroke cycle and finally to the 8-stroke cycle, for the purpose of utilizing the known advantages offered by multi-stroke cycles at rather high speeds, and at the same time facilitating the starting. It may be mentioned that an engine working on a multi-stroke cycle furnishes more power than when working on the two-stroke cycle, because the loss of charging air during scavenging occurs, in the case of the two-stroke cycle, at every charge which corresponds to a pumping stroke, whereas with a multi-stroke cycle this loss only occurs for that charge which is delivered by the pump and which scavenges the combustion gases out of the cylinder, but not in the case of the remaining charges, which are stored from time to time in the reservoir and the cylinder.

Furthermore for a multi-stroke cycle, as described above, besides the air delivered by the pump, the air drawn by suction into the working space can also be used.

In Figures 11a and 11b is illustrated by way of example a construction by which the motor is enabled to be run on a cycle comprising either two or four or six strokes, etc.; that part of the valve gear being shown which actuates the outlet valve 36 or 36ª. A is the rod controlling the movement of the valve. This rod is provided with a roller B and is moved by the cams C or D or E according to the position of the cam disc H which is slidable on the cam shaft F. The cam disc is running with a sixth of the number of turns of the motor, so that, when working on the two-stroke, six cams E will be put into action during one revolution of the cam shaft. If, however, the cam disc is displaced by means of the sliding ring G, so that the three cams C will come into action, the outlet valve will be opened three times during one revolution of the cam disc, and the motor, therefore, will run on the four-stroke. And if the cams D are brought to action, of which cams there are two, the motor will work on the six-stroke.

The fuel valve is controlled in the same manner as the outlet valve by means of a slidable cam disc.

What I claim is:—

1. A method of operating internal combustion engines of the Diesel type working on a cycle comprising four or more strokes, characterized in that the power cylinder, at the turning of the stroke at the end of the combustion stroke, is (by means of a compressor or the like operated independently of the power cylinder piston) scavenged and charged with air to a degree already sufficient for a power stroke, and that this air charge together with additional charging air supplied during the subsequent strokes of the cycle is compressed in the power cylinder during its inward stroke immediately preceding the combustion.

2. Method as set forth in claim 1, in which the supply of combustion air is effected not only by delivery of air by a compressor but also by suction of air into the power cylinder.

3. In combination, an internal combustion engine of the Diesel type working on a cycle comprising four or more strokes and having a cylinder with a piston reciprocable therein, a chamber providing a reservoir for air, compressor means operable independent of the engine to supply compressed air to the reservoir, valve means to admit compressed air to the power cylinder at the turning of the stroke at the end of the combustion stroke and to charge the cylinder with air sufficient for a power stroke, means to admit subsequent charges of compressed air into the power cylinder to be compressed by its piston and stored in the reservoir, and means to admit the stored air into the power cylinder to be compressed therein during the inward stroke of the piston immediately preceding combustion.

4. An internal combustion engine of the Diesel type working on a cycle of four or more strokes and having a cylinder with a piston reciprocable therein, means to supply compressed air to the cylinder to scavenge the cylinder and charge it with air sufficient for a power stroke at the end of the combustion stroke, and means for supplying additional compressed air to the cylinder during subsequent strokes of the cycle, all the air charges thus supplied to the cylinder being compressed together in the cylinder by its piston during the instroke immediately preceding combustion.

In witness whereof I have hereunto signed my name.

EMIL SCHIMANEK.